United States Patent Office.

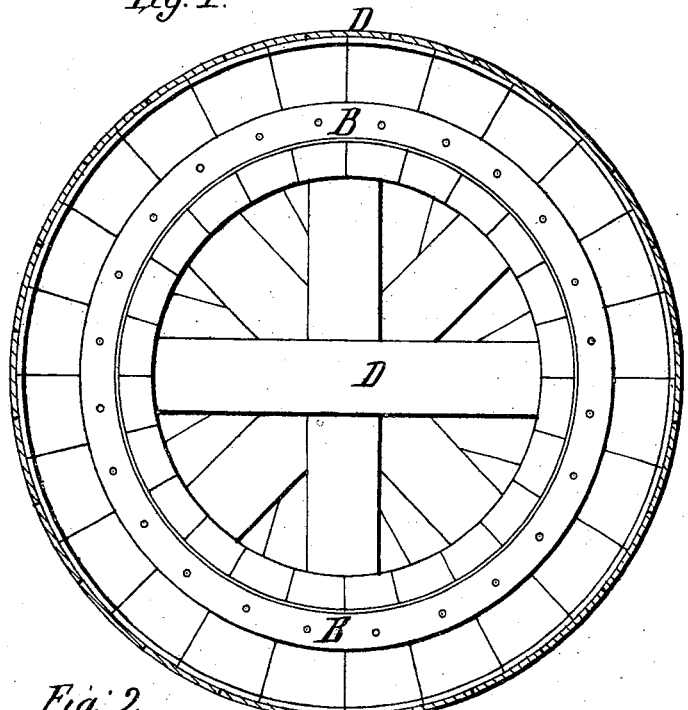
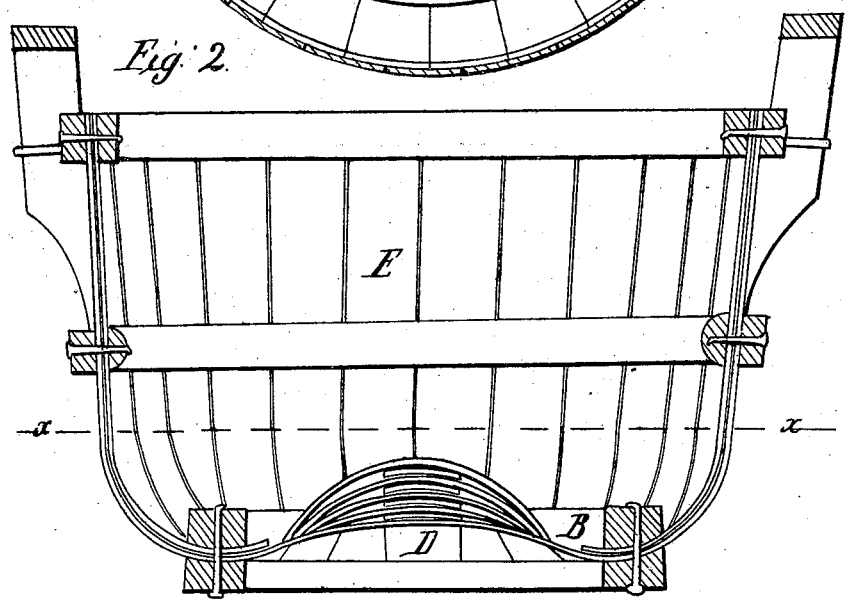

HORACE C. JONES, OF DOWAGIAC, MICHIGAN.

Letters Patent No. 113,059, dated March 28, 1871.

IMPROVEMENT IN STAVE-BASKETS.

The Schedule referred to in these Letters Patent and making part of the same.

I, HORACE C. JONES, of Dowagiac, in the county of Cass and State of Michigan, have invented certain Improvements in Stave-Baskets, of which the following is a specification.

My invention relates to that class of baskets known as stave-baskets; and

This part of my invention consists in constructing the bottom of the basket in such form as to require less material, and so it will not retain moisture as long, and, consequently, will not decay as soon as baskets constructed in the usual manner, and so that it will not require as much power to crimp the bottom to the necessary form, the object being to produce a lighter, cheaper, and more durable basket than has hitherto been done.

In the accompanying drawing—

Figure 1 is a top view of the inside of the basket-bottom, shown below the line $x$ in fig. 2.

Figure 2 is a vertical transverse section of the basket.

The kind of baskets embodying my invention is designed to be used for handling coarse grain and farm produce, and such baskets are frequently exposed to damp and wet condition, and when the bottoms are composed of a great number of thicknesses of material, and once become wet, they are very slow to dry out, and heavy to handle, and decay very fast.

I construct the main body of the basket of two thicknesses of staves, and hoop them in the manner described in the schedule to my patent of August 11, 1868, of which my present invention is designed to be an improvement; but I terminate the inner series of staves E at or near the inner edge of the hoop B, using a sufficient number of staves to break joints with the outer series of staves D.

These staves are so arranged as to break joints with the inner series in the body of the basket; but at the base they break joints with each other and form the entire bottom, and as it is the outer series only that must be crimped to form the bilge of the basket-bottom it will require much less power than when both series of staves extend across the bottom, and it will be seen that less material will be required to construct the basket on this plan.

What I claim as my improvement herein, and desire to secure by Letters Patent, is—

Constructing a basket of two thicknesses of staves or splints, the outer thickness or covering being composed of splints which extend from side to side of the basket, forming its bottom, and the inner thickness or lining being composed of a series of splints which terminate at or near the lower inside hoop B of the basket, substantially as and for the purpose described.

HORACE C. JONES.

Witnesses:
CHAUNCEY T. LEE,
SHEPHERD H. WHEELER.